US012694689B2

(12) United States Patent
Iizuka et al.

(10) Patent No.: US 12,694,689 B2
(45) Date of Patent: Jul. 28, 2026

(54) VEHICLE CONTROL SYSTEM EXTERNALITY RECOGNITION DEVICE AND VEHICLE CONTROL METHOD

(71) Applicant: Hitachi Astemo, Ltd., Hitachinaka (JP)

(72) Inventors: Jyunya Iizuka, Hitachinaka (JP); Takashi Okada, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 282 days.

(21) Appl. No.: 18/269,753

(22) PCT Filed: Sep. 13, 2021

(86) PCT No.: PCT/JP2021/033485
§ 371 (c)(1),
(2) Date: Jun. 26, 2023

(87) PCT Pub. No.: WO2022/145093
PCT Pub. Date: Jul. 7, 2022

(65) Prior Publication Data
US 2024/0071095 A1 Feb. 29, 2024

(30) Foreign Application Priority Data
Dec. 28, 2020 (JP) ................................. 2020-218815

(51) Int. Cl.
*G06V 20/58* (2022.01)
*B60W 50/00* (2006.01)

(52) U.S. Cl.
CPC ......... *G06V 20/58* (2022.01); *B60W 50/0098* (2013.01); *B60W 2420/403* (2013.01);
(Continued)

(58) Field of Classification Search
None
See application file for complete search history.

(56) References Cited

U.S. PATENT DOCUMENTS

| 11,550,322 B1 * | 1/2023 | Christie | ................. G05D 1/628 |
| 2006/0031015 A1 * | 2/2006 | Paradie | ..................... G06T 7/70 |
| | | | 340/436 |

(Continued)

FOREIGN PATENT DOCUMENTS

| JP | 2018-036796 A | 3/2018 |
| JP | 2018-097688 A | 6/2018 |

(Continued)

OTHER PUBLICATIONS

English Translation of International Search Report of International Application No. PCT/JP2021/033485 dated Oct. 19, 2021 (2 pages).
(Continued)

*Primary Examiner* — Thomas D Lee
(74) *Attorney, Agent, or Firm* — Foley & Lardner LLP

(57) ABSTRACT

A vehicle control system includes a first and a second sensor type; and a processor configured to detect a target around a vehicle using the first type sensor and the second type sensor; obtain, from the first type sensor, first detection information and obtain, from the second type sensor, second detection information. The second type sensor has a longer delay time to obtain the second detection information relative to a time to obtain the first detection information from the first type sensor. The processor is further configured to generate prompt report information based on at least one of the first or the second detection information; generate integrated information based on an integration between the first and the second detection information; generate an instruction based on at least one of the prompt report information or the integrated information; and control the vehicle subsequent to execution of the instruction.

9 Claims, 12 Drawing Sheets

VISUAL FIELD RANGE V$_B$

VISUAL FIELD RANGE V$_{A1}$

VISUAL FIELD RANGE V$_{A2}$

EXTERNALITY SENSOR A$_1$

EXTERNALITY SENSOR A$_2$

EXTERNALITY SENSOR B

VEHICLE 100

(52) U.S. Cl.

CPC ................. *B60W 2420/408* (2024.01); *B60W 2554/4049* (2020.02)

(56) References Cited

U.S. PATENT DOCUMENTS

| | | | |
|---|---|---|---|
| 2014/0140353 A1 | 5/2014 | Stählin et al. | |
| 2017/0341644 A1 | 11/2017 | Grewe | |
| 2018/0164424 A1 | 6/2018 | Takaki | |
| 2019/0232956 A1* | 8/2019 | Takaki | ................. G01S 13/931 |
| 2021/0403015 A1 | 12/2021 | Kato et al. | |
| 2022/0179423 A1* | 6/2022 | Kakuta | ................ G05D 1/0077 |

FOREIGN PATENT DOCUMENTS

| | | | |
|---|---|---|---|
| JP | 2020-024562 A | 2/2020 |
| KR | 10-2019-0106844 A | 9/2019 |
| WO | WO-2019/026438 A1 | 2/2019 |

OTHER PUBLICATIONS

Geneva, Patrick; Eckenhoff, Kevin; Huang, Guoquan: Asynchronous multi-sensor fusion for 3D mapping and localization. In: 2018 IEEE International Conference on Robotics and Automation (ICRA), May 21-25, 2018, Brisbane, S. 5994-5999. – ISBN 978-1-5386-3082-2. URL: https://ieeexplore.IEEE.org/abstract/document/8460204 [retrieved on Nov. 5, 2026].

German Office Action issued in DE Application No. 112021005463.5 dated May 11, 2026 with English translation (15 Pages).

* cited by examiner

VEHICLE CONTROL SYSTEM EXTERNALITY RECOGNITION DEVICE AND VEHICLE CONTROL METHOD

TECHNICAL FIELD

The present invention relates to a vehicle control system, an externality recognition device, and a vehicle control method which are adopted in a vehicle, detect a position and a movement of an object, a person, or the like existing around an own vehicle, and supply information and a signal for avoiding danger to a driver or an own vehicle system.

BACKGROUND ART

Recently, various driving assistance systems for vehicles have been developed. The driving assistance system can be roughly classified into a comfort and convenience improvement system and a safety system. The comfort and convenience improvement systems aim to reduce a burden on a driver in a continuous and relatively monotonous driving operation, and adaptive cruise control (ACC) or the like is a typical example thereof. On the other hand, the safety systems are intended to support the driver in a critical traveling situation, to avoid an accident, and to reduce the influence of the accident. In addition, while a situation where a driving assistance system is adopted has been expanded, there is a trend to mount a larger number of externality sensors in order to expand a monitoring range (distance, viewing angle, and object) around a vehicle.

On the other hand, a technique of integrating outputs of a plurality of sensor devices to recognize an object with higher accuracy has been proposed (for example, PTL 1). Such a technique is called sensor fusion. In general, in a case where an object is recognized by sensor fusion, it can be said that the reliability of recognition is higher than that in a case where the object is recognized based on the output of the single device. However, there is a problem that the completion of processing is delayed as compared with a case where the object is recognized based on the output of the single sensor device while the reliability is high.

In consideration of this point, an object of PTL 1 is to obtain a prompt sensor fusion result more quickly. For example, in the field of solution of the abstract of Patent Literature 1, a first processing unit that is mounted on a vehicle, outputs object information by performing at least processing A on the basis of an output of a first device for recognizing an object, and outputs the object information by performing processing B having more man-hours than the processing A, a second processing unit that outputs object information by performing at least processing C on the basis of an output of a second device attached to the vehicle so as to set the same direction as that of the first device as a detection range, and outputs the object information by performing processing D having more man-hours than the processing C, a first integrated recognition unit that recognizes an object on the basis of the object information obtained as a result of the processing A and the object information obtained as a result of the processing C, object information obtained as a result of the processing B, and, a second integrated recognition unit that recognizes an object on the basis of object information obtained as a result of the processing D.

On the other hand, for each sensor device referred to when sensor fusion is performed, the time required to detect the position from an object is not necessarily the same between the sensor devices. For example, when the detection results of the electromagnetic wave sensor and the image sensor are integrated, if the time required to detect the position of an object by the electromagnetic wave sensor is shorter than the time required to detect the position of the object by the image sensor, a second position detected by the image sensor may be the position of the object at a time past a first position detected by the electromagnetic wave sensor. PTL 2 discloses an object detection device and an object detection method capable of reducing an error caused by calculating position information of an object using the first position and the second position.

For example, PTL 2, in the field of solution of the abstract, describes that the ECU includes an object determination unit which performs identity determination of objects based on a first position and a second position, a correction unit which corrects one of the first position and the second position based on a time difference between a first time required for the electromagnetic wave sensor to detect an object and a second time required for the image sensor to detect an object when the object determination unit determines that the objects are identical, such that the first position and the second position are the position of the object detected at the same time point, and a calculation unit which calculates position information of the object using the first position and the corrected second position, or the second position and the corrected first position.

CITATION LIST

Patent Literature

PTL 1: JP 2020-24562 A
PTL 2: JP 2018-97688 A

SUMMARY OF INVENTION

Technical Problem

As described above, when the sensor fusion is used, the reliability of recognition is increased as compared with a case where an object is recognized based on an output of a single device, but the completion of the processing is delayed. As a factor of delaying this processing, there is processing of correcting a timing difference disclosed in PTL 2.

When there is a timing difference between a plurality of sensor devices used as inputs of sensor fusion, an error occurs in a result of the sensor fusion due to a difference in time at which the position is detected for the same object. On the other hand, in a case where the detection result of the position of each sensor device is corrected (hereinafter, referred to as time synchronization) to be the position of the object detected at the same time point as in the device disclosed in PTL 2, the sensor fusion result has a problem that the timing at which the detection result is obtained is further delayed as compared with the sensor device having the longest time until the result is output among the individual sensor devices.

In PTL 1, in each sensor device, two processing units having different man-hours up to generation of a recognition result are provided, and two integration recognition units of a first integration recognition unit and a second integration recognition unit are provided. In this configuration, by allocating one of the recognition results from the respective sensor devices which has the larger man-hours to the first integration recognition unit and allocating one with the smaller man-hours to the second integration recognition unit, a prompt recognition result can be obtained from the latter with respect to the former recognition result. However, in this configuration, it is assumed that the timings of the sensor devices do not coincide with each other.

When a time synchronization process for correcting a timing difference between sensor devices as disclosed in PTL 2 is applied as a means for reducing an error due to this influence, there is a problem that a delay time until output of a detection result caused by time synchronization remains.

On the other hand, when focusing on a driving assistance system that performs processing with reference to a sensor device at a subsequent stage and an object recognition result from sensor fusion, the requirement for the reliability of recognition or the time required for completion of processing is not uniform depending on the function to be executed. In the comfort and convenience improvement system, in order to ensure stability, the reliability of recognition is emphasized among the reliability of recognition and the time required for completion of processing. On the contrary, since the safety system requires a quick response to cope with a situation of great urgency such as avoidance of an accident, the time required for completion of processing is emphasized. In particular, for a safety system, an increase in delay time due to application of sensor fusion can be a harmful effect.

In view of the above circumstances, a main object of the present invention is to provide a vehicle control system, an externality recognition device, and a vehicle control method capable of supplying a recognition result having reliability of a recognition result and the time required for completion of generation processing adapted to each of a plurality of different driving support functions.

Solution to Problem

In order to solve the above problems, a vehicle control system according to the present invention includes: an externality recognition device which detects a target around a vehicle; an accuracy-prioritized control unit which controls an in-vehicle control target based on integrated information supplied from the externality recognition device; and a response-prioritized control unit which controls an in-vehicle control target based on prompt report information supplied from the externality recognition device, wherein the externality recognition device includes: a first type sensor which detects the target and outputs first detection information; a second type sensor which detects the target and outputs second detection information, the second type sensor having a longer delay time required to output detection information than the first type sensor; and a sensor fusion processing unit which generates the integrated information and the prompt report information based on the first detection information and the second detection information; and a controller which generates an activation instruction of the response-prioritized control unit based on the prompt report information.

Further, a vehicle control method of the present invention is a vehicle control method in a vehicle including an externality recognition device which detects a target around the vehicle, an accuracy-prioritized control unit which controls an in-vehicle control target based on integrated information supplied from the externality recognition device, and a response-prioritized control unit which controls the in-vehicle control target based on prompt report information supplied from the externality recognition device, the vehicle control method including: a step of detecting the target with a first type sensor and outputting first detection information;

a step of detecting the target with a second type sensor having a longer delay time required for outputting detection information from the first type sensor, and outputting second detection information; and a step of individually outputting the first detection information or the second detection information to generate the prompt report information; a step of integrating the first detection information and the second detection information to generate the integrated information; a step of generating an activation instruction of the response-prioritized control unit based on the prompt report information; and a step of controlling the in-vehicle control target based on the prompt report information.

Advantageous Effects of Invention

It is possible to provide a more appropriate detection result for each vehicle control function having different priorities between the delay amount due to the time required to generate the recognition result and the accuracy of the recognition result, and to enhance the safety, convenience, and comfort of the vehicle.

BRIEF DESCRIPTION OF DRAWINGS

FIG. 5 is a third configuration example of the sensor fusion processing unit in FIG. 2.

FIG. 10 is a third configuration example of the sensor fusion processing unit in FIG. 7.

FIG. 12 is a schematic configuration diagram of an externality recognition device of the third embodiment.

DESCRIPTION OF EMBODIMENTS

Figure 1:
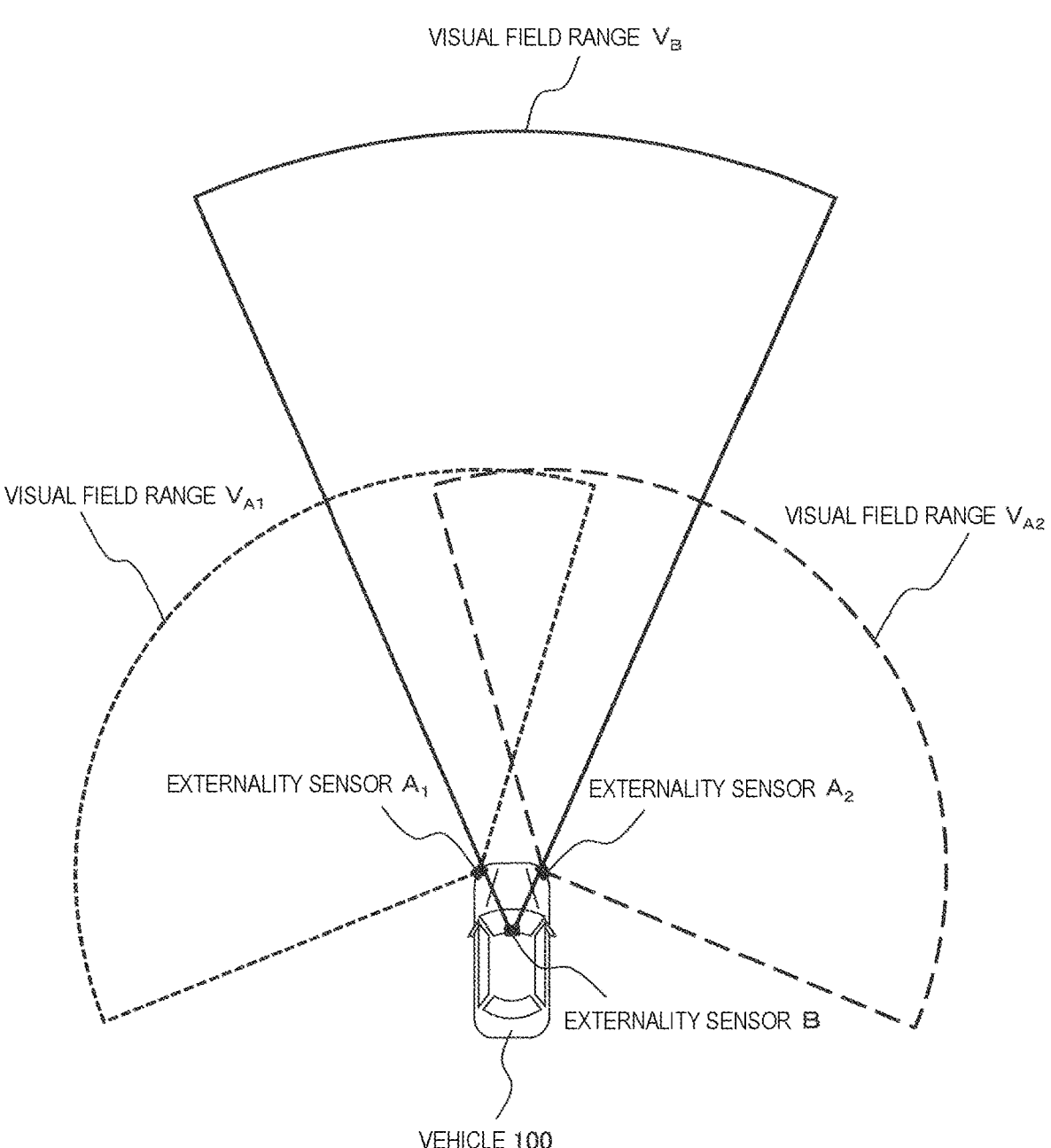
FIG. 1 is a visual field range of each externality sensor mounted on a vehicle.

Hereinafter, three embodiments of the externality recognition device of the present invention will be described with reference to the drawings. In the drawings, objects to which the same numbers are assigned represent the same components, and redundant description will be omitted. Note that, although application to a driving assistance system will be described as an example in any of the embodiments, application to an automatic driving system is also possible, and a similar effect can be obtained.

First Embodiment

First, an externality recognition device 10 according to the first embodiment of the present invention will be described with reference to FIGS. 1 through 6.

FIG. 1 is a plan view illustrating a visual field range V of each externality sensor in a vehicle 100 on which an externality recognition device 10 of the present embodiment is mounted. In the vehicle 100, an externality sensor A₁ is provided on the front left, an externality sensor A₂ is provided on the front right, and an externality sensor B is provided on the upper portion of the inner surface of the windshield, as sensor devices that detect other surrounding vehicles, pedestrians, bicycles, obstacles, and the like (hereinafter, collectively referred to as a target) and measure information such as a relative position, a relative speed, and a width thereof, and the like (hereinafter, collectively referred to as detection information).

The externality sensors A₁ and A₂ are sensor devices of the same type mainly used to prevent collision with a vehicle approaching from the left and right at the time of entering an intersection or the like, and they are, for example, millimeter wave radars capable of covering a wide visual field range V$_{A1}$ on the left front of the vehicle 100 and a wide visual field range V$_{A2}$ on the right front.

In addition, the externality sensor B is a sensor device of a type different from the externality sensors A₁ and A₂, which is mainly used to detect a pedestrian or an obstacle (a falling object such as cardboard) far in the traveling direction, and a peripheral sign, a traffic light, a white line marked on a road surface, and the like, and the externality sensor B is, for example, an in-vehicle camera (stereo camera, monocular camera) capable of detecting an object type or position information in the visual field range V$_B$ in front of the vehicle 100. Note that it is assumed that the externality sensor B requires a longer time to output the detection information than the externality sensors A₁ and A₂.

Figure 2:
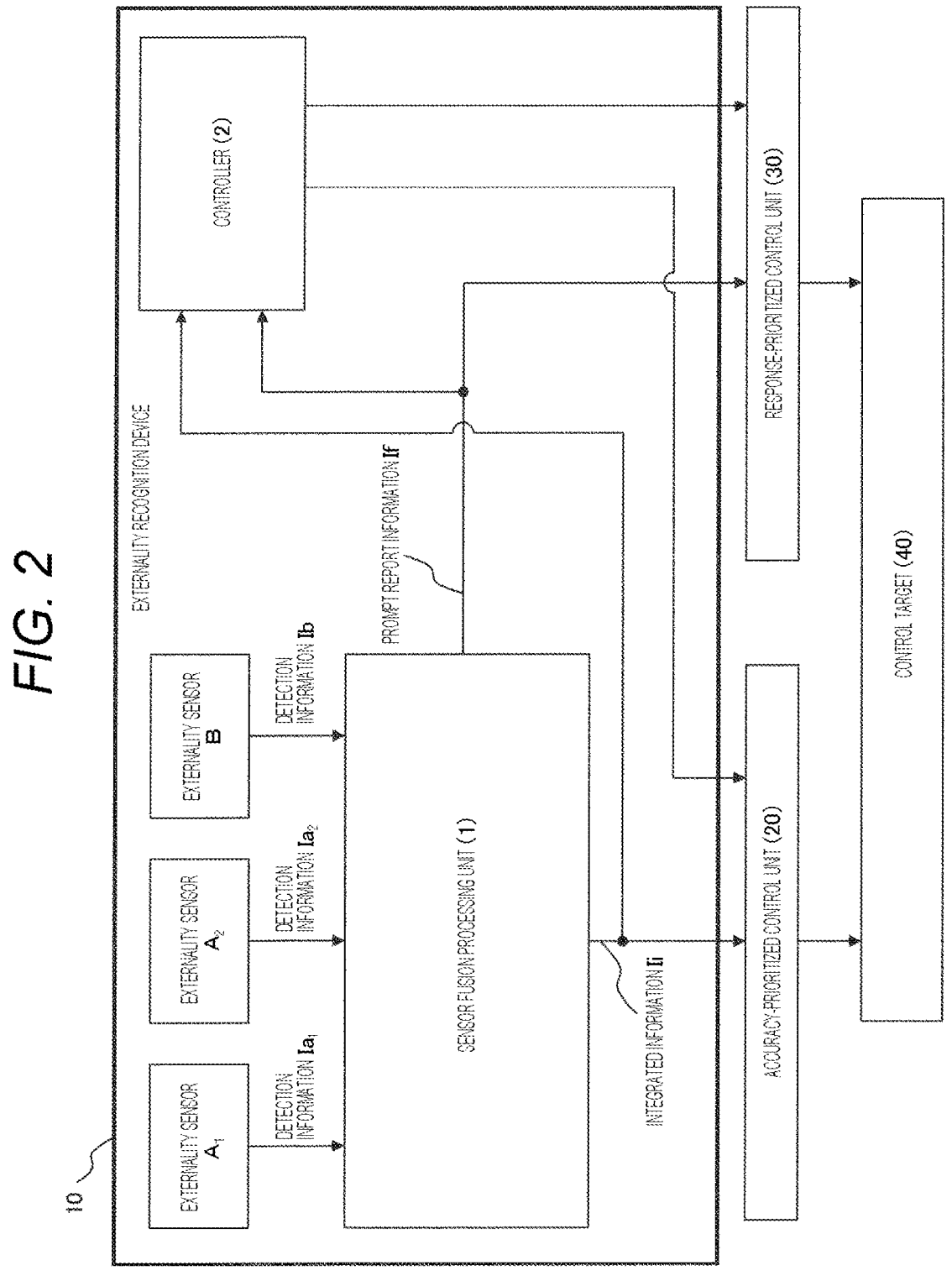
FIG. 2 is a schematic configuration diagram of an externality recognition device according to the first embodiment.

FIG. 2 is a diagram for describing a schematic configuration of the externality recognition device 10 mounted on the vehicle 100 and a method of using an output of the externality recognition device 10. As illustrated here, the externality recognition device 10 includes a sensor fusion processing unit 1 and a controller 2 in addition to the externality sensors A₁, A₂, and B described above. Furthermore, an accuracy-prioritized control unit 20 and a response-prioritized control unit 30 are provided on the output side of the externality recognition device 10, and both processing units control a control target 40 based on the output of the externality recognition device 10. Each unit will be sequentially described below.

<Control Target 40>

The control target 40 is a device or a system mounted on the vehicle 100, and is a control target when driving assistance or automatic driving is executed based on the output of the externality recognition device 10. For example, if the content of driving assistance is an alert function for warning the driver of danger or abnormality, a liquid crystal display, a speaker, or the like is the control target 40, and if the content of driving assistance is a deceleration stop function for collision avoidance, a brake system is the control target 40. In addition, if the driving assistance is a lane deviation prevention function of preventing deviation from the traveling lane, the steering system is the control target 40.

<Accuracy-Prioritized Control Unit 20>

The accuracy-prioritized control unit 20 is a processing unit which executes control processing having a small influence on the processing result even if the reaction to the detection information of each externality sensor is slightly delayed. For example, the comfort and convenience improvement system that executes continuous and relatively monotonous control for improving comfort and convenience, represented by adaptive cruise control (ACC) which performs following travel while maintaining a substantially constant distance from a preceding vehicle, lane deviation prevention assistance for preventing deviating from a lane during travel, or the like, is applicable. Note that the accuracy-prioritized control unit 20 is specifically implemented by an electronic control unit (ECU).

<Response-Prioritized Control Unit 30>

The response-prioritized control unit 30 is a processing unit which executes control processing that has a large influence on the processing result when the response to the detection information of each externality sensor is delayed. For example, the safety system that supports a driver under a critical traveling situation such as a pedestrian jumping out on a road, and executes control for avoiding an accident and reducing an accident influence is applicable. Note that the response-prioritized control unit 30 is specifically implemented by an electronic control unit (ECU).

<Externality Recognition Device 10>

As described above, the externality recognition device 10 in FIG. 2 includes the sensor fusion processing unit 1 and the controller 2 in addition to the two types and three externality sensors A₁, A₂, and B.

The sensor fusion processing unit 1, as a first function, integrates a plurality of pieces of detection information Ia₁, Ia₂, and Ib regarding the same target acquired by each externality sensor, generates a single integrated information Ii, and supplies the integrated information Ii to the accuracy-prioritized control unit 20 and the controller 2. In addition, the sensor fusion processing unit 1, as a second function, individually supplies a plurality of pieces of detection information Ia₁, Ia₂, and Ib regarding the same target acquired by each externality sensor as prompt report information If to the response-prioritized control unit 30 and the controller 2.

The controller 2 appropriately performs activation, stop, and initialization of the response-prioritized control unit 30 and switch of the flow of signals and data based on the input integrated information Ii and the prompt report information If. Details of the processing in the controller 2 will be described later with reference to FIG. 6.

<First Configuration Example of Sensor Fusion Processing Unit 1>

Figure 3:
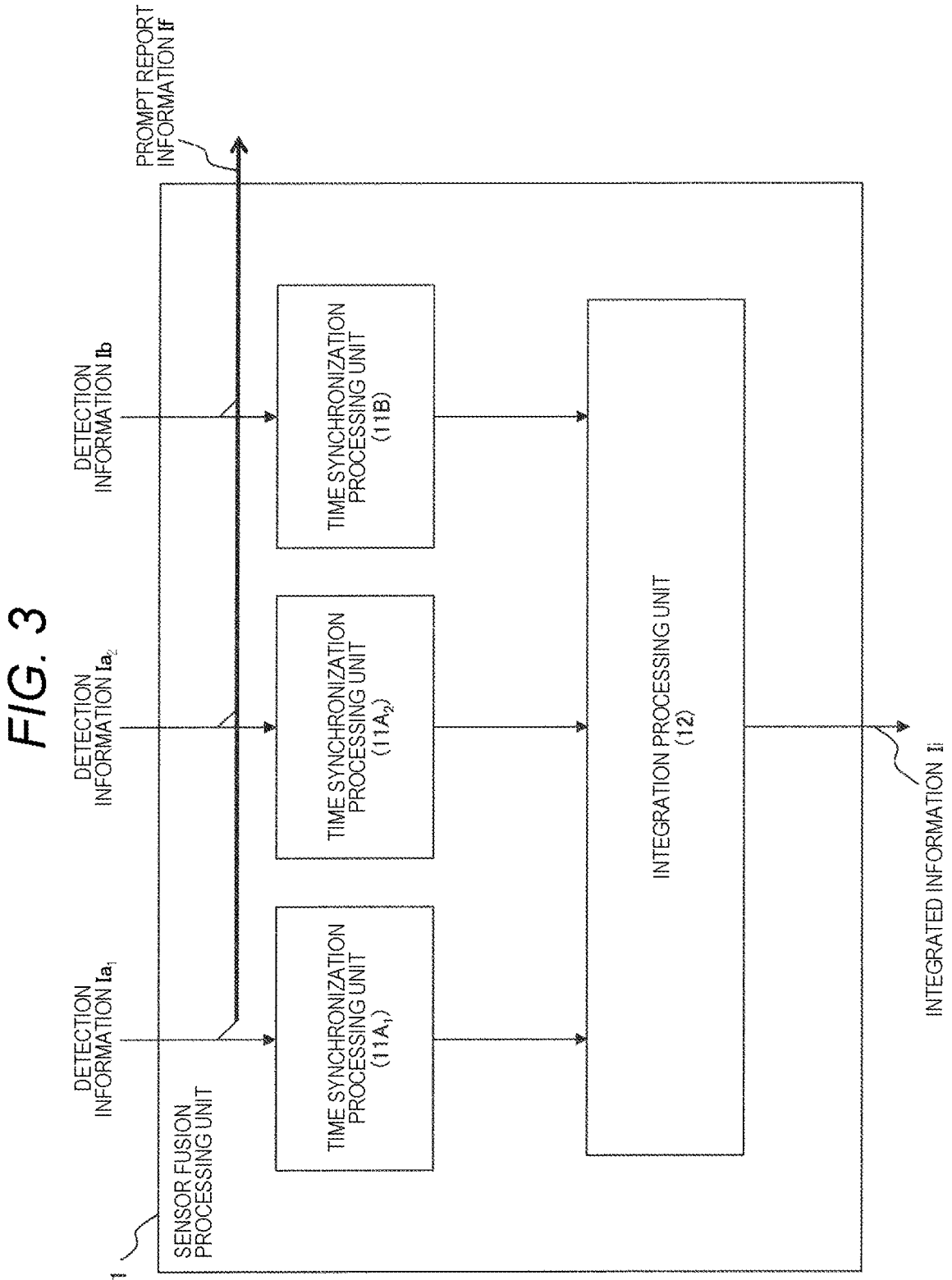
FIG. 3 is a first configuration example of a sensor fusion processing unit in FIG. 2.

FIG. 3 illustrates a first configuration example of the sensor fusion processing unit 1. The sensor fusion processing unit 1 exemplified here corresponds to the three externality sensors A₁, A₂, and B, and includes three time synchronization processing units 11 (11A₁, 11A₂, 11B) and an integration processing unit 12 that integrates the outputs thereof.

As described above, since the detection methods are different between the externality sensors A₁ and A₂ and the externality sensor B, the time (delay time) required for outputting each detection information is also different. Therefore, even in the detection information on the same target simultaneously input to the sensor fusion processing unit 1, the detection times of the target are different between the detection information Ia₁ and Ia₂ of the externality sensors A₁ and A₂ and the detection information Ib of the externality sensor B, and the relative positions, the relative speeds, and the like of the same target indicated by the respective detection information do not match.

Accordingly, first, the time synchronization processing units 11A₁, 11A₂, and 11B perform processing (hereinafter, referred to as time synchronization processing) of resampling the values of the data string of the detection target at the same time point from the data strings of the detection information Ia₁, Ia₂, and Ib at different detection times obtained from the externality sensors A₁, A₂, and B. If the time after the resampling is set to be the same as the processing timing of the integration processing unit 12 in the subsequent stage, the processing of the integration processing unit 12 can be easily performed. For example, the time synchronization processing is performed by interpolating data before and after the target time. Hereinafter, the data obtained by the time synchronization processing is referred to as post-synchronization information Is.

Next, the integration processing unit 12 selects detection information indicating detection information at the same time point from the post-synchronization information Is of each of the time synchronization processing units 11A₁, 11A₂, and 11B, and based on the selected detection information, groups data for the same detection object and obtains the integrated information Ii for each group. For this processing, an αβ filter, a Kalman filter, or the like can be applied, and generally, a detection result with higher reliability than the detection information in the preceding stage and the post-synchronization information Is can be obtained. In order to perform one-step of the processing in the integration processing unit 12, post-synchronization information Is from all the sensors to be integrated needs to be obtained for the time to be processed in the step. Therefore, the integrated information Ii is given a delay amount equal to or larger than the largest delay amount among the time synchronization processing units 11A₁, 11A₂, and 11B. As described above, the integrated information Ii is more reliable than the individual pieces of detection information Ia₁, Ia₂, and Ib before the integration, but has a larger delay amount than any of the pieces of detection information before the integration. Therefore, the integrated information Ii is information suitable for use in the accuracy-prioritized control unit 20 in which the influence of the delay on the processing result is small.

In addition, in the sensor fusion processing unit 1 of FIG. 3, the pieces of detection information Ia₁, Ia₂, and Ib in the preceding stages of the time synchronization processing units 11A₁, 11A₂, and 11B are individually directly output as the prompt report information If. In this configuration, the result of the prompt report information If can be obtained at a timing earlier than the integrated information Ii by the amount of delay added by being rate-determined to the one with the largest delay amount among the integration processing targets in the processing of the interpolation processing performed by each time synchronization processing unit and the processing of the integration processing unit 12. Therefore, the prompt report information If is information suitable for use in the response-prioritized control unit 30, which has a larger influence of delay on the processing result than the integrated information Ii.

<Second Configuration Example of Sensor Fusion Processing Unit 1>

Figure 4:
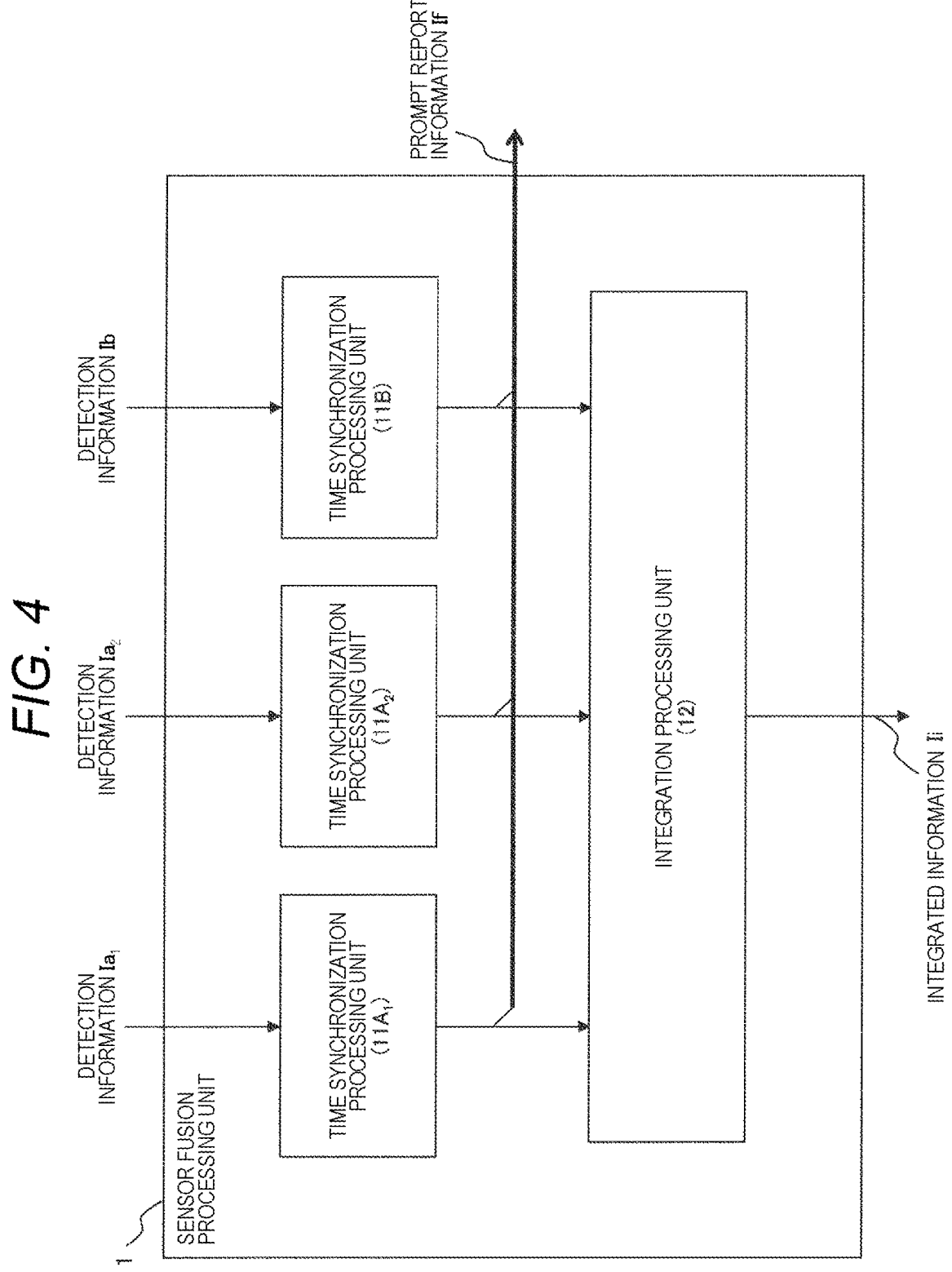
FIG. 4 is a second configuration example of the sensor fusion processing unit in FIG. 2.

FIG. 4 illustrates a second configuration example of the sensor fusion processing unit 1. In FIG. 3, the detection information before the processing of the time synchronization processing unit 11 is output as the prompt report information If, but in the sensor fusion processing unit 1 of FIG. 4, the post-synchronization information Is after the processing of the time synchronization processing unit 11 is output as the prompt report information If. In this case, since the result of the prompt report information If can be obtained at a timing earlier than the integrated information Ii by the amount of delay added by being rate-determined to the integrated processing target having the largest amount of delay in the processing of the integration processing unit 12, the prompt report information If is information suitable for use in the response-prioritized control unit 30 having a greater influence of delay than the integrated information Ii also in FIG. 4.

<Third Configuration Example of Sensor Fusion Processing Unit 1>

Figure 5:
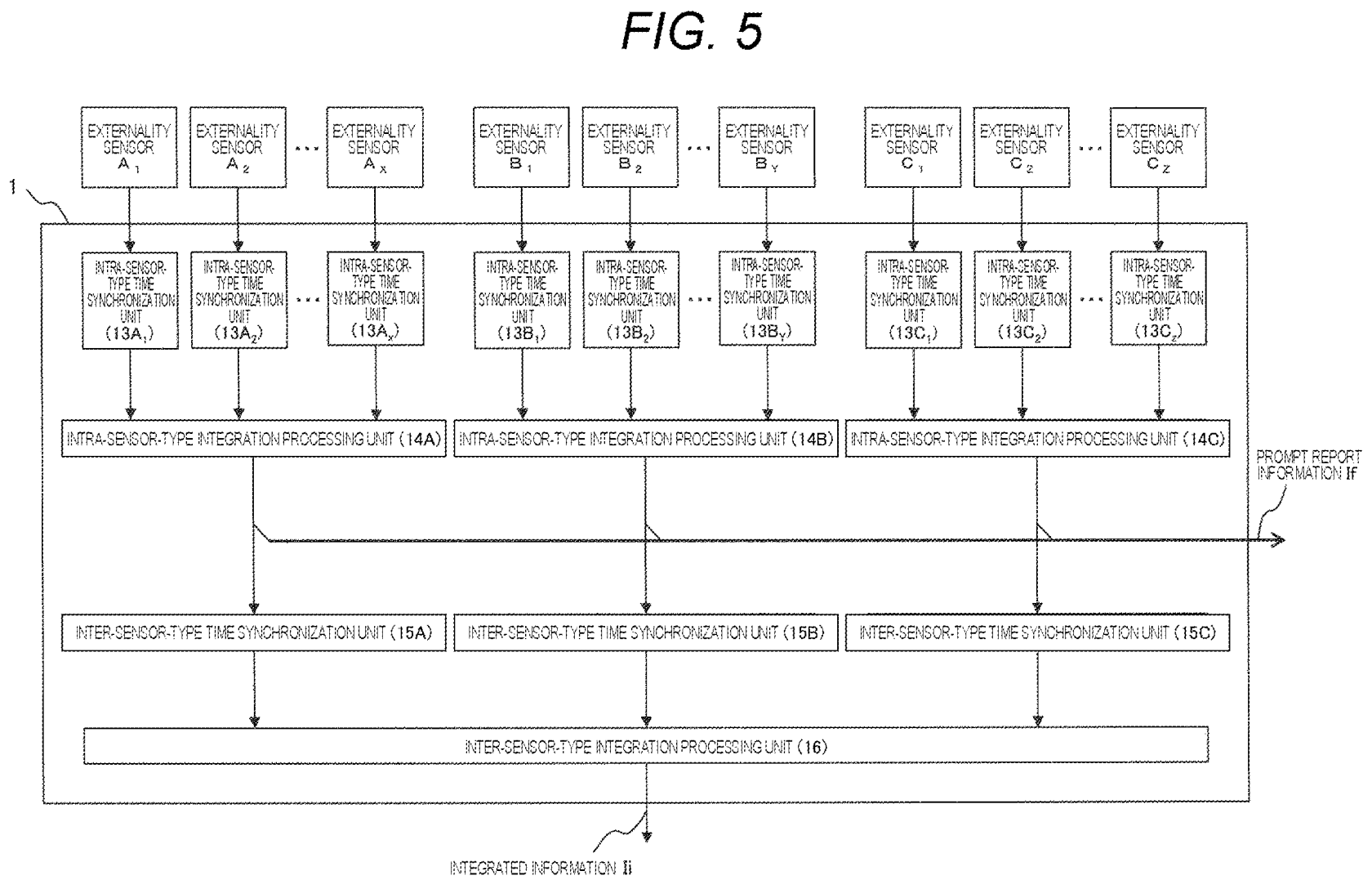

FIG. 5 illustrates a third configuration example of the sensor fusion processing unit 1. In FIG. 2, the externality recognition device 10 using the two types and three externality sensors A₁, A₂ and B is illustrated, but the number of types of externality sensors used in the externality recognition device 10 and the number of externality sensors are not limited to this example.

For example, as illustrated in FIG. 5, in a case where X externality sensors of A type (for example, millimeter wave radar), Y externality sensors of B type (for example, in-vehicle camera), and Z externality sensors of C type (for example, LiDAR) are provided, the sensor fusion processing unit 1 may be configured to be able to generate the prompt report information If and the integrated information Ii from the detection information of these externality sensors.

As described above, although the processing time required to generate the detection information depends on the sensor type, if the same type and the same processing time are integrated, the intermediate integrated information Ii_A to Ii_C having a small delay amount due to the integration can be obtained for each type, and the intermediate integrated information Ii_A to Ii_C can be output as the prompt report information If. Furthermore, the final integrated information Ii can be obtained by further integrating the intermediate integrated information Ii_A to Ii_C. Therefore, in the configuration illustrated in FIG. 5, while the detection accuracy is improved by the intermediate integration processing, it is possible to obtain the prompt report information Ii in which the delay amount added by performing the final integration processing is suppressed to be relatively small. Hereinafter, the configuration of FIG. 5 will be described in detail.

In FIG. 5, each of the externality sensors A₁ to A_X is an A type sensor, and the time required for generating the detection information by each sensor is substantially equal. The externality sensors A₁ to A_X are provided with an intra-sensor-type time synchronization unit 13A₁ to 13A_X and an intra-sensor-type integration processing unit 14A. The intra-sensor-type time synchronization unit 13A₁ to 13A_X performs time synchronization processing on the detection information from the externality sensors A₁ to A_X, and generates post-synchronization information Is corresponding to the same time. The intra-sensor-type integration processing unit 14A integrates the post-synchronization information Is, and generates integrated information (hereinafter, described as A type integrated information Ii_A) for the externality sensors A₁ to A_X.

Similarly, the B type externality sensors B₁ to B_Y are provided with the intra-sensor-type time synchronization unit 13B₁ to 13B_Y and the intra-sensor-type integration processing unit 14B, and the C type externality sensors C₁ to C_Z are provided with the intra-sensor-type time synchronization unit 13C₁ to 13C_Z and the intra-sensor-type integration processing unit 14C. Then, the B type integration processing unit 14B generates B type integrated information Ii_B, and the C type integration processing unit 14C generates C type integrated information Ii_C.

The sensor fusion processing unit 1 of FIG. 5 individually outputs the A type integrated information Ii_A, the B type integrated information Ii_B, and the C type integrated information Ii_C obtained in this manner as the prompt report information If. Reliability of the prompt report information If is improved by intra-sensor-type intermediate integration processing. Furthermore, since the detection information having the same delay amount is integrated, the increase amount of the delay for aligning the sampling time of the data in the integration can be made smaller than the integration between the sensors of different types. Therefore, while the prompt report information If in FIG. 5 is information that is generated on the assumption that it is used by the response-prioritized control unit 30 and prioritizes prompt reporting, the reliability is also improved.

Further, the inter-sensor-type time synchronization units 15A, 15B, and 15C perform the time synchronization processing on the A type integrated detection information $\text{Ii}_A$, the B type integrated detection information $\text{Ii}_B$, and the C type integrated detection information $\text{Ii}_C$, respectively, and perform resampling to the detection information at the same time point. These are integrated by the inter-sensor-type integration processing unit 16 to obtain final integrated information Ii in which the information in types A, B, and C are integrated. As described above, in the third configuration example of the sensor fusion processing unit 1 illustrated in FIG. 5, it is possible to obtain the prompt report information If in which the delay amount is suppressed to be small while improving the detection accuracy by the intermediate integration processing.

<Processing Flow of Activation and Stop of Response-Prioritized Control Unit>

Figure 6:
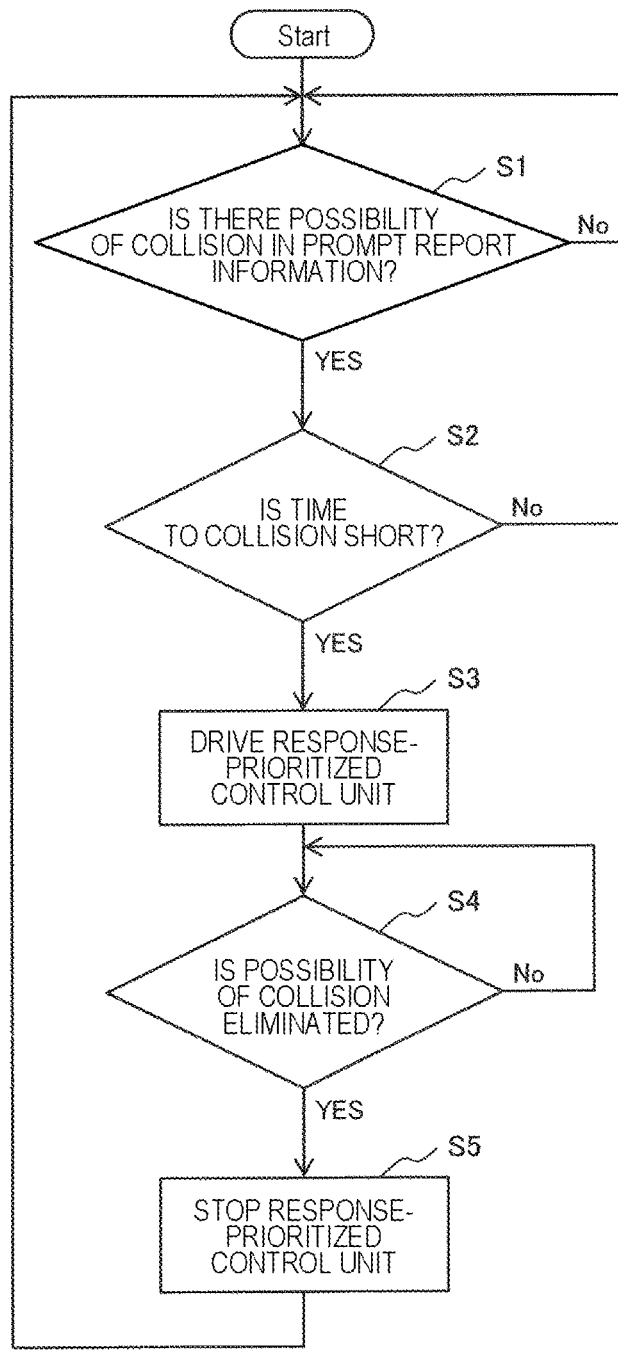
FIG. 6 is a flowchart of processing of activation and stop of a response-prioritized control unit.

FIG. 6 is an example of a processing flow of activation and stop of the response-prioritized control unit 30 by the controller 2. Here, while the accuracy-prioritized control unit 20 is activated at all times, the response-prioritized control unit 30 is activated only when it is determined that there is a large risk of danger occurring most recently. In addition, in order to reduce the activation delay of the response-prioritized control unit 30, the prompt report information If is referred to in the determination of the necessity of activation of the response-prioritized control unit 30.

First, in step S1, the controller 2 determines whether there is a possibility that a target (other vehicles, pedestrians, bicycles, obstacles, etc.) detected by each externality sensor collides with the own vehicle based on the prompt report information If input from the sensor fusion processing unit 1. For example, it can be determined as Yes when the trajectory in a case of traveling in the relative movement direction from the relative position of the object overlaps the area obtained by adding the width of the object to the periphery of the own vehicle. In a case where an error is expected, even if they do not overlap, it may be determined that there is a possibility of collision (Yes) as long as the angle difference between the angle range regarded as collision and the relative movement direction falls within a certain range. Then, if there is a possibility of collision, the process proceeds to step S2, and if there is no possibility of collision, the process returns to step S1.

Next, in step S2, the controller 2 calculates the time required for the movement of the relative distance based on the relative position and the relative speed of the target having a possibility of collision, and determines Yes when the time is equal to or less than the reference time. Then, if the time to collision is shorter than the reference time, the process proceeds to step S3, and if the time to collision is longer than the reference time, the process returns to step S1.

In step S3, the controller 2 transmits an activation instruction to the response-prioritized control unit 30 to activate the response-prioritized control unit 30. As a result, the response-prioritized control unit 30 can warn the driver of the possibility of collision via the liquid crystal display or the speaker, or operate the brake system to stop the own vehicle as necessary.

In step S4, the controller 2 determines whether the possibility of collision has been eliminated based on the integrated information Ii input from the sensor fusion processing unit 1. Then, if the possibility of collision is eliminated, the process proceeds to step S5, and if the possibility of collision is not eliminated, the process returns to step S4. In this step, the possibility that the detected target collides with the own vehicle is determined using the method similar to that in step S1. However, since quick response is not necessary as compared with the determination in steps S1 and S2, the integrated information Ii with higher accuracy is used instead of the prompt report information If with less delay.

In step S5, the controller 2 transmits a stop instruction to the response-prioritized control unit 30 to stop the response-prioritized control unit 30. Then, the process returns to step S1. As a result, the response-prioritized control unit 30 can be activated only during a period in which there is a possibility of collision with a target around the own vehicle.

According to the externality recognition device of the first embodiment described above, the presence or absence of danger is determined based on the prompt report information with a small delay, and if there is danger, the response-prioritized control unit (safety system or the like) is controlled based on the prompt report information with a small delay. On the other hand, if there is no danger, the accuracy-prioritized control unit (the comfort and convenience improvement system or the like) is controlled based on the integrated information with highly accuracy. As described above, in the highly urgent control processing, the prompt report information with a small delay is referred to, and the integrated information with highly accuracy is referred to in the control processing with priority on accuracy, so that both the safety of the vehicle and the convenience and comfort can be achieved.

Second Embodiment

Next, an externality recognition device 10A according to the second embodiment of the present invention will be described with reference to FIGS. 7 to 11. Redundant description of common points with the first embodiment will be omitted.

As illustrated in FIG. 2, the externality recognition device 10A according to the first embodiment outputs the prompt report information If to the response-prioritized control unit 30, and the response-prioritized control unit 30 controls the control target 40 based on the prompt report information If having a small delay amount. However, since the prompt report information If is less reliable than the integrated information Ii, it may be more appropriate to use the integrated information Ii in the response-prioritized control unit 30 even considering that the delay amount is large under adverse conditions.

Therefore, in the externality recognition device 10A of the present embodiment, statistical information of the prompt report information If is obtained in advance, and in a case where the reliability of the prompt report information If is sufficiently high, processing in the response-prioritized control unit 30 is executed with reference to the prompt report information If, as in the first embodiment. On the other hand, in a case where the reliability of the prompt report information If is not sufficient, processing in the response-prioritized control unit 30 is executed with reference to the integrated information Ii. As a result, it is possible to obtain the same effect as in the first embodiment under an environment where the reliability of the prompt report information If is high, and to avoid adverse effects caused by reference to the prompt report information If under an environment where the reliability of the prompt report information If is insufficient. Hereinafter, the externality recognition device 10A according to the present embodiment will be described focusing on the differences from the first embodiment.

Figure 7:
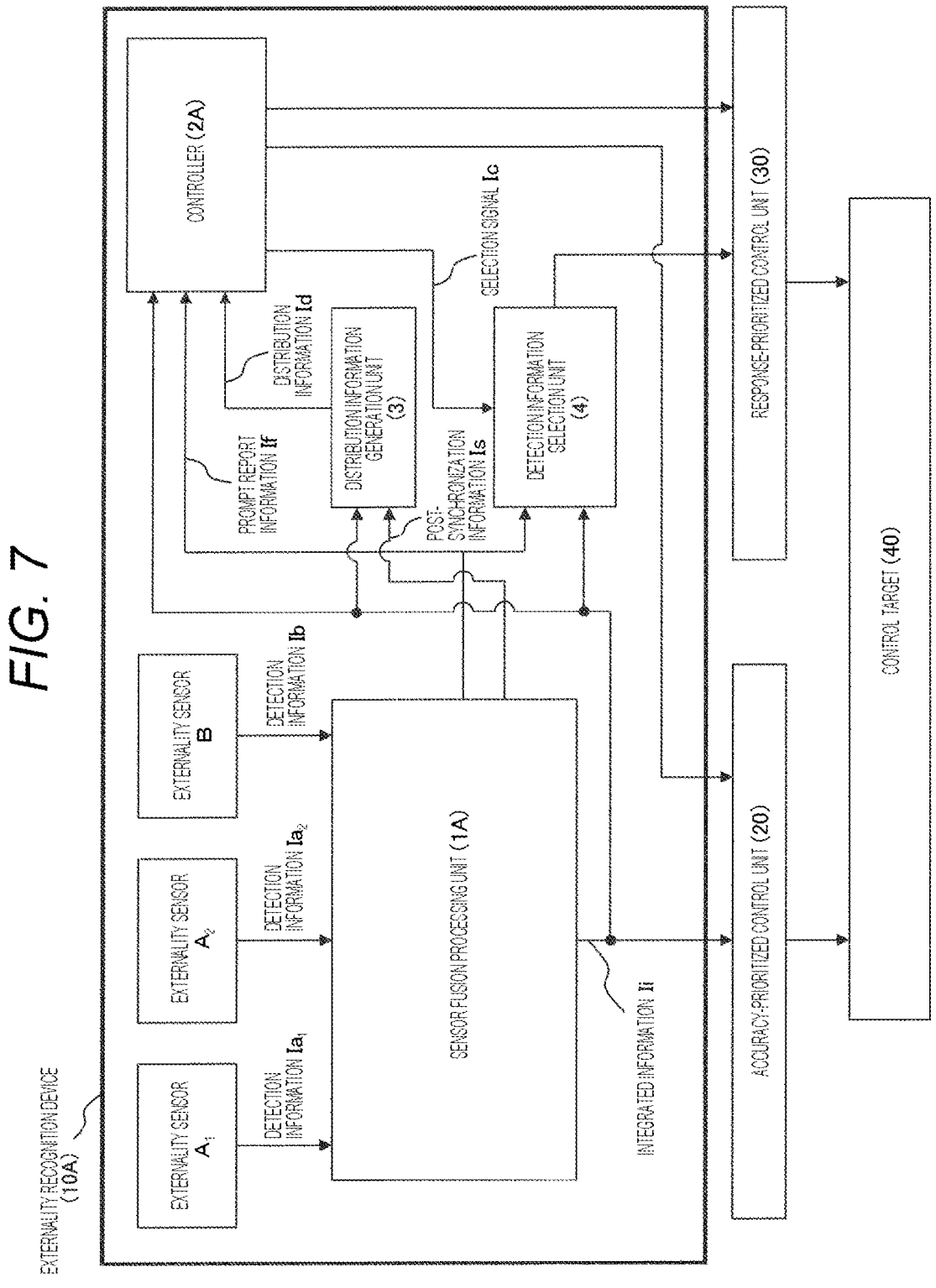
FIG. 7 is a schematic configuration diagram of an externality recognition device according to the second embodiment.

FIG. 7 is a schematic configuration of an externality recognition device 10A of the present embodiment. The differences from the externality recognition device 10 of the first embodiment illustrated in FIG. 2 and the like are that the sensor fusion processing unit 1 is replaced with a sensor fusion processing unit 1A, the controller 2 is replaced with a controller 2A, and a distribution information generation unit 3 and a detection information selection unit 4 are added.

Similarly to the sensor fusion processing unit 1 of the first embodiment, the sensor fusion processing unit 1A not only outputs the integrated information Ii and the prompt report information If, but also outputs the post-synchronization information Is. The post-synchronization information Is is detection information which has the same reliability as that of the prompt report information If, and has the same sampling time as that of the integrated information Ii. A configuration for generating the post-synchronization information Is will be described later.

The distribution information generation unit 3 obtains distribution information Id for each detection component element (for example, relative distance, relative angle, relative speed, and the like) of the integrated information Ii and the post-synchronization information Is in order to determine the reliability of the prompt report information If. Here, the distribution information Id represents, for example, a correlation coefficient, a covariance, an average, a variance, or an intermediate processing value for obtaining them.

In addition to the processing equivalent to that of the controller 2 of the first embodiment, the controller 2A selects the detection information to be given to the response-prioritized control unit 30 with reference to the distribution information Id, and outputs a selection signal Ic according to the selection result. In the present embodiment, a correlation coefficient between the post-synchronization information Is and the integrated information Ii is obtained, and if the value is sufficiently large, it is determined that the reliability is sufficient.

In accordance with the selection signal Ic from the controller 2A, the detection information selection unit 4 supplies either the prompt report information If or the integrated information Ii input from the sensor fusion processing unit 1A to the response-prioritized control unit 30. Note that it is not necessary to input all of the integrated information Ii generated by the sensor fusion processing unit 1A to the detection information selection unit 4, and the integrated information Ii thinned out to some extent may be input.

<First Configuration Example of Sensor Fusion Processing Unit 1A>

Figure 8:
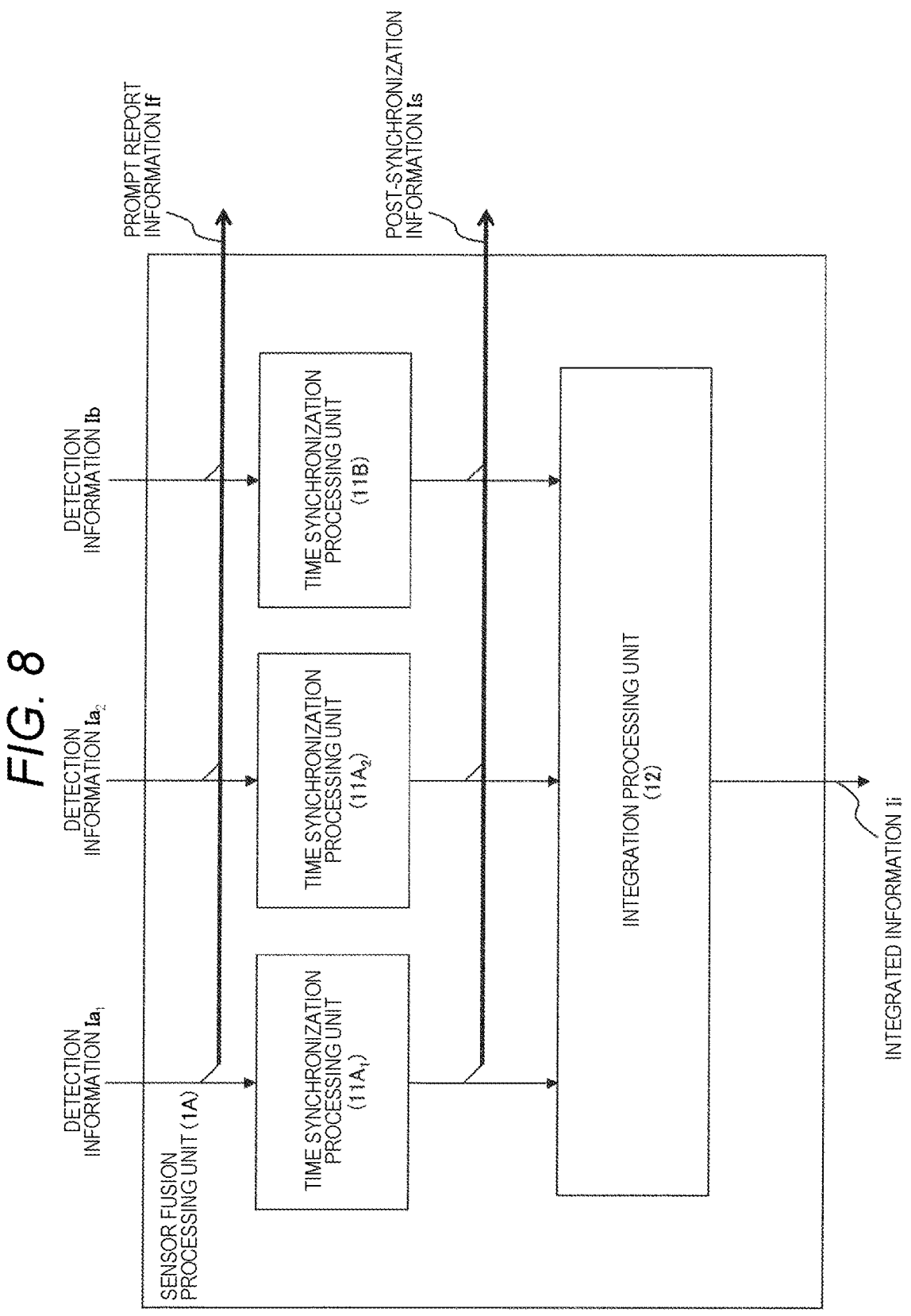
FIG. 8 is a first configuration example of the sensor fusion processing unit in FIG. 7.

FIG. 8 illustrates a first configuration example of the sensor fusion processing unit 1A of the present embodiment. In the first configuration example (FIG. 3) of the sensor fusion processing unit 1 of the first embodiment, the detection information before the processing of the time synchronization processing unit 11 is output as the prompt report information If. However, the sensor fusion processing unit 1A of FIG. 8 further outputs the detection information after the processing of the time synchronization processing unit 11 as the post-synchronization information Is. The post-synchronization information Is obtained in this way is detection information which has reliability equivalent to that of the prompt report information If, and has the sampling time equivalent to that of the integrated information Ii.

<Second Configuration Example of Sensor Fusion Processing Unit 1A>

Figure 9:
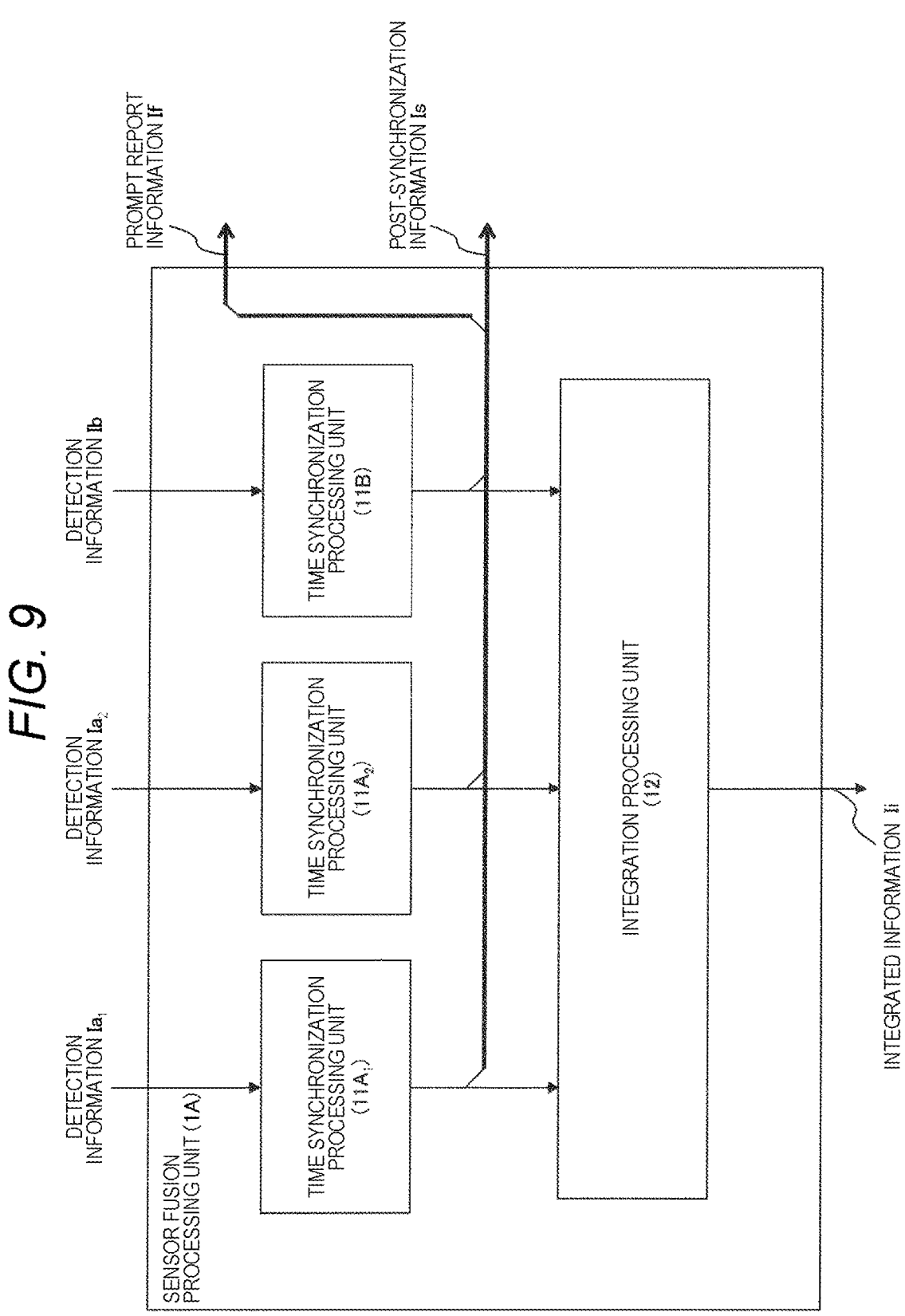
FIG. 9 is a second configuration example of the sensor fusion processing unit in FIG. 7.

FIG. 9 illustrates a second configuration example of the sensor fusion processing unit 1A of the present embodiment. In the second configuration example (FIG. 4) of the sensor fusion processing unit 1 of the first embodiment, the detection information after the processing of the time synchronization processing unit 11 is output as the prompt report information If. However, the sensor fusion processing unit 1A of FIG. 9 further outputs the detection information after the processing of the time synchronization processing unit 11 as the post-synchronization information Is. The post-synchronization information Is obtained in this way is detection information which is equivalent to the prompt report information If, and has the sampling time equivalent to that of the integrated information Ii.

<Third Configuration Example of Sensor Fusion Processing Unit 1A>

Figure 10:
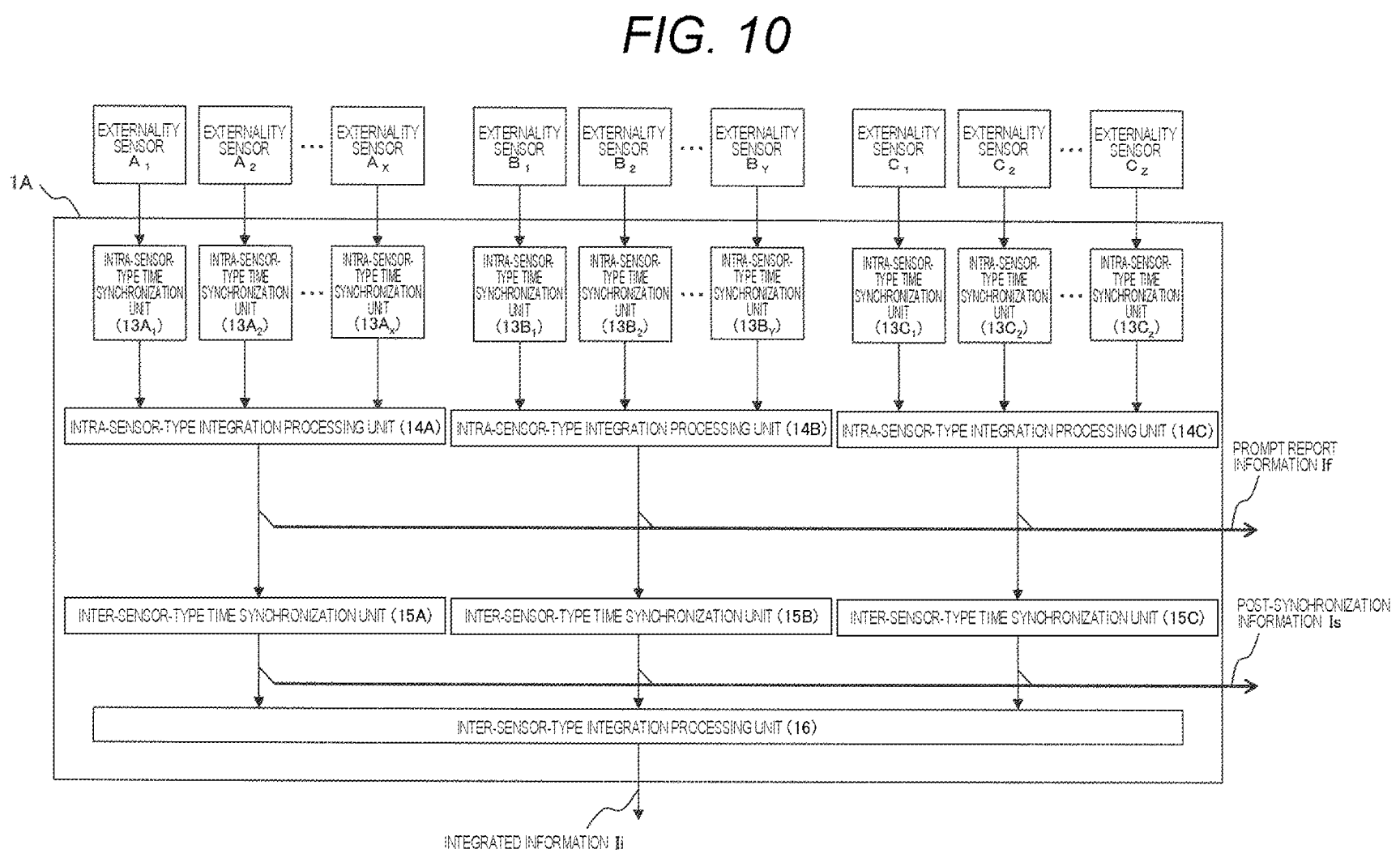

FIG. 10 illustrates a third configuration example of the sensor fusion processing unit 1A of the present embodiment. In the third configuration example (FIG. 5) of the sensor fusion processing unit 1 of the first embodiment, the detection information after the processing of the intra-sensor-type integration processing units 14A, 14B, and 14C is output as the prompt report information If. However, the sensor fusion processing unit 1A of FIG. 10 further outputs the detection information after the processing of the inter-sensor-type time synchronization units 15A, 15B, and 15C as the post-synchronization information Is. The post-synchronization information Is obtained in this way is detection information which has reliability equivalent to that of the prompt report information If, and has the sampling time equivalent to that of the integrated information Ii.

<Distribution Information Generation Unit 3>

Figure 11:
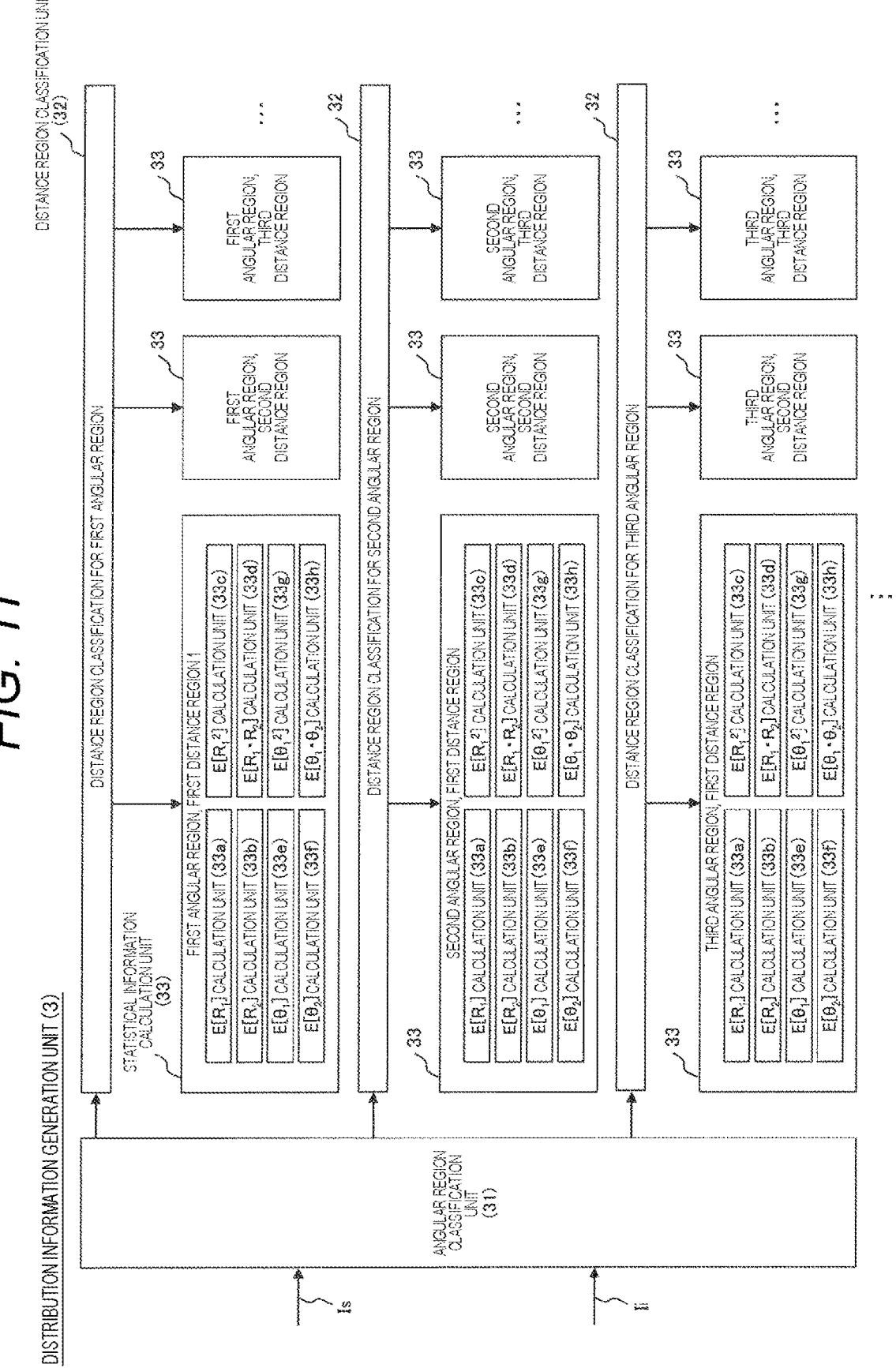
FIG. 11 is a configuration example of a distribution information generation unit in FIG. 7.

FIG. 11 is a configuration example of the distribution information generation unit 3. The distribution information generation unit 3 illustrated here obtains distribution information Id (intermediate processing value) for obtaining a correlation coefficient between the integrated information Ii and the post-synchronization information Is for each small region centered on the own vehicle. In this drawing, for the sake of simplicity, the distribution information generation unit 3 which obtains the correlation for each small region in which two elements of the distance and the angle are combined is illustrated. However, the correlation may be obtained for each combination of three elements of the distance, the angle, and the speed. In this case, the classification unit and the calculation unit to be described later may be added according to the number of combinations of elements.

Note that the prompt report information If and the integrated information Ii are different in sampling time of the detection information, and the prompt report information If is inappropriate as a target for evaluating the correlation coefficient. Therefore, the distribution information generation unit 3 in FIG. 11 evaluates the correlation coefficient using the post-synchronization information Is whose sampling time is the same as that of the integrated information Ii. In this case, since responsiveness is not emphasized in the processing of obtaining the correlation coefficient which is statistical information, there is no problem even if post-synchronization information Is including a delay is used.

As illustrated in FIG. 11, the distribution information generation unit 3 includes an angular region classification unit 31, a distance region classification unit 32, and a statistical information calculation unit 33. The angular region classification unit 31 classifies the integrated information Ii and the post-synchronization information Is based on the angle information of the integrated information Ii having high reliability and a wide detection range, and selects a distribution destination. The distance region classification unit 32 further classifies the integrated information Ii and the post-synchronization information Is distributed from the angular region classification unit 31 in the similar way by the distance of the integrated information Ii, and selects a distribution destination. The statistical information calculation unit 33 obtains the distribution information Id or the intermediate processing value for obtaining the distribution information Id for each small region classified by the angular direction and the distance by the angular region classification unit 31 and the distance region classification unit 32. Here, an intermediate processing value for obtaining the correlation coefficient is obtained. Details of the statistical information calculation unit 33 will be described below.

The statistical information calculation unit 33 prepared for each small region includes the following calculation unit as a block that calculates an intermediate processing value for obtaining a correlation coefficient.

The E [$R_1$] calculation unit 33a calculates an average value E [$R_1$] of the distance information $R_1$ which is a distance detection value from the own vehicle to the target in the detection information Ii. The E [$R_2$] calculator 33b calculates an average value E [$R_2$] of the distance information $R_2$ which is a distance detection value from the own vehicle to the target in the post-synchronization information Is. The E [$R_1^2$] calculation unit 33c calculates an average value E [$R_1^2$] of the squares of the distance information $R_1$. The E [$R_1 \cdot R_2$] calculation unit 33d calculates an average value E [$R_1 \cdot R_2$] of the product of the distance information $R_1$ and the distance information $R_2$.

In addition, the E [$\theta_1$] calculation unit 33e calculates an average value E [$\theta_1$] of the angle information $\theta_1$ which is a relative angle detection value of the target with respect to the own vehicle traveling direction in the integrated information Ii. The E [$\theta_2$] calculation unit 33f calculates an average value E [$\theta_2$] of the angle information $\theta_2$ which is a relative angle detection value of the target with respect to the own vehicle traveling direction in the post-synchronization information Is. The E [$\theta_1^2$] calculation unit 33g calculates an average value E [$\theta_1^2$] of the squares of the angle information $\theta_1$. The E [$\theta_1 \cdot \theta_2$] calculation unit 33h calculates an average value E [$\theta_1 \cdot \theta_2$] of the product of the angle information $\theta_1$ and the angle information $\theta_2$.

In this way, the distribution information generation unit 3 in FIG. 11 outputs each value calculated by the E [$\theta_1 \cdot \theta_2$] calculation unit 33h from the E [$R_1$] calculation unit 33a as the distribution information Id for each small region.

<Controller 2A>

The controller 2A obtains a correlation coefficient between the post-synchronization information Is and the integrated information Ii related to the distance information and the angle information by using the distribution information Id input from the distribution information generation unit 3. An equation for calculating the correlation is described by Equations 1 and 2, and the correlation can be calculated by substituting each value obtained by the E

[$\theta_1 \cdot \theta_2$] calculation unit 33h from the E [$R_1$] calculation unit 33a into each element in the equation.

[Equation 1]

$$\text{Correlation coefficient between } R_1 \text{ and } R_2 = \frac{\text{Covariance between } R_1 \text{ and } R_2}{(\text{standard deviation of } R_1) \, (\text{standard deviation of } R_2)} = \qquad (\text{Equation 1})$$

$$\frac{E[R_1 \cdot R_2] - E[R_1]E[R_2]}{\sqrt{E[R_1^2] - E[R_1]^2} \, \sqrt{E[R_2^2] - E[R_2]^2}}$$

[Equation 2]

$$\text{Correlation coefficient between } \theta_1 \text{ and } \theta_2 = \frac{\text{Covariance between } \theta_1 \text{ and } \theta_2}{(\text{standard deviation of } \theta_1) \, (\text{standard deviation of } \theta_2)} = \qquad (\text{Equation 2})$$

$$\frac{E[\theta_1 \cdot \theta_2] - E[\theta_1]E[\theta_2]}{\sqrt{E[\theta_1^2] - E[\theta_1]^2} \, \sqrt{E[\theta_2^2] - E[\theta_2]^2}}$$

In general, the larger the correlation coefficient is, the stronger the correlation between the target binary values is. Therefore, if the correlation coefficient between the post-synchronization information Is and the integrated information Ii is large, the reliability of the prompt report information If having the reliability equivalent to that of the post-synchronization information Is is also high.

Therefore, if the magnitude of the calculated correlation coefficient is sufficient, the controller 2A generates the selection signal Ic for selecting the prompt report information If confirmed to have high reliability. On the other hand, if the magnitude of the calculated correlation coefficient is not sufficient, the controller 2A generates the selection signal Ic for selecting the integrated information Ii. Then, the detection information selection unit 4 supplies the prompt report information If or the integrated information Ii selected according to the selection signal Ic to the response-prioritized control unit 30.

According to the externality recognition device 10A of the present embodiment described above, in a case where it is appropriate to use the integrated information Ii in the response-prioritized control unit 30 even in consideration of the large delay amount, the processing in the response-prioritized control unit 30 is executed based on the integrated information Ii. Therefore, it is possible to avoid adverse effects caused by referring to the prompt report information If under adverse conditions.

Third Embodiment

Next, an externality recognition device 10B according to the third embodiment of the present invention will be described with reference to FIG. 12. Redundant description of common points with the above embodiments will be omitted.

In the externality recognition device 10A of the second embodiment illustrated in FIG. 7, the prompt report information If output by the sensor fusion processing unit 1A is used as it is in the subsequent processing. However, in the externality recognition device 10B of this embodiment, the prompt report information If output by the sensor fusion processing unit 1A is corrected and reliability is brought closer to the integrated information Ii and then used in the subsequent processing. Hereinafter, the externality recognition device 10B according to the present embodiment will be described focusing on the differences from the second embodiment.

Figure 12:
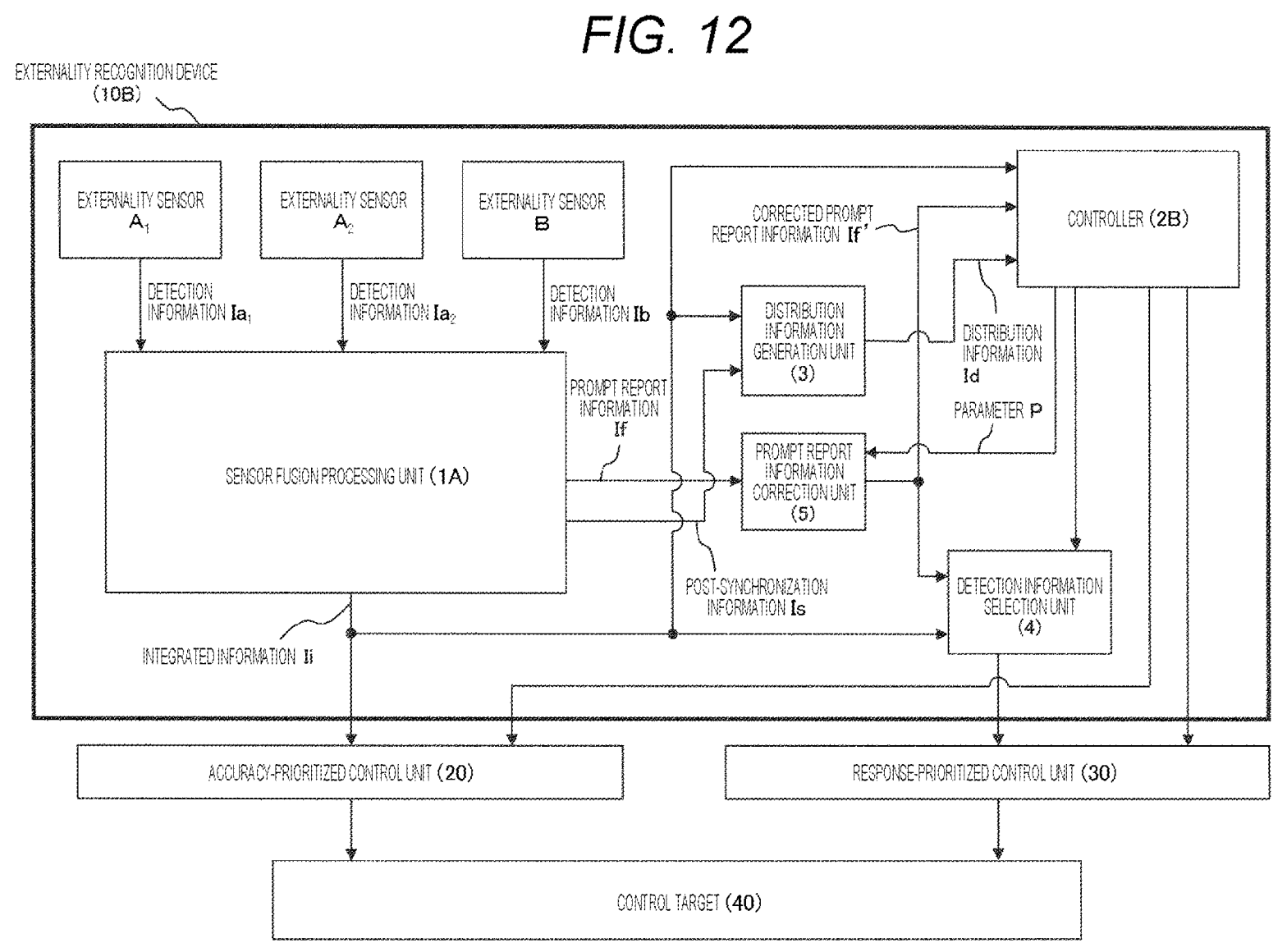

FIG. 12 is a schematic configuration of an externality recognition device 10B of the present embodiment. The differences from the externality recognition device 10A of the second embodiment illustrated in FIG. 7 are that the controller 2A is replaced with a controller 2B, and a prompt report information correction unit 5 is added.

The differences between the controller 2B of the present embodiment and the controller 2A of the second embodiment are roughly divided into the following two points. The first point is that the controller 2B obtains a parameter P to be described later and supplies the parameter P to the prompt report information correction unit 5. The other point is that the controller 2B determines the activation timing of the response-prioritized control unit 30 based on the corrected prompt report information If' instead of the prompt report information If.

The prompt report information correction unit 5 uses the parameter P from the controller 2B, and generates corrected prompt report information If' with high reliability which is obtained by correcting the prompt report information If. Based on the distribution information of the post-synchronization information Is with respect to the integrated information Ii for each distance and each angular range obtained by the distribution information generation unit 3, for example, a regression line by the least-squares method of the integrated information Ii and the post-synchronization information Is of each region can be obtained. Although the post-synchronization information Is and the prompt report information If are different in sampling time, the characteristics related to the sensitivity error are similar. Therefore, if the characteristics of the regression line are reflected in the prompt report information If, the error caused by the deviation in sensitivity can be corrected.

Equation 3 represents an example of an equation for correcting the distance information and the angle information of the prompt report information If. As shown in this equation, by using the parameters P (specifically, $A_R$, $A_{74}$, $B_R$, and $B_\theta$) and the distribution information Id (specifically, E [$R_1$], E [$R_2$], and the like) output by the distribution information generation unit 3, it is possible to generate the corrected prompt report information If' from the prompt report information If.

[Equation 3]

Distance information of corrected prompt report information If'=$A_R$(distance information of prompt report information If)+$B_R$Angle information of corrected prompt report information If'=$A_\theta$(angle information of prompt report information If)+$B_\theta$    (Equation 4)

Note that each of the values of $A_R$, $A_\theta$, $B_R$, and $B_\theta$ in Equation 3 is parameters P supplied to the prompt report information correction unit 5 by the controller 2B, and can be calculated by Equations 4 to 7.

[Equation 4]

$$A_R = \frac{\text{Covariance between distance information of post-synchronization information } Is \text{ and distance information of integrated information } Ii}{\text{Variance of distance information of post-synchronization } Is} = \frac{E[R_1 \cdot R_2] - E[R_1]E[R_2]}{E[R_2^2] - E[R_2]^2}$$    (Equation 4)

-continued

[Equation 5]

$$A_\theta = \frac{\text{Covariance between angle information of post-synchronization information } Is \text{ and angle information of integrated information } Ii}{\text{Variance of angle information of post-synchronization } Is} = \frac{E[\theta_1 \cdot \theta_2] - E[\theta_1]E[\theta_2]}{E[\theta_2^2] - E[\theta_2]^2}$$    (Equation 5)

[Equation 6]

$B_R =$    (Equation 6)

(average of distance information of integrated information Ii) $- A_R \cdot$ (average of distance information of post-synchronization information Is) $= E[R_1] - A_R \cdot E[R_2]$

[Equation 7]

$B_\theta =$    (Equation 7)

(average of angle information of integrated information Ii) $- A_R \cdot$ (average of angle information of post-synchronization information Is) $= E[\theta_1] - A_\theta \cdot E[\theta_2]$ According to the externality recognition device 10B of the present embodiment described above, the corrected prompt report information If' with enhanced reliability of the prompt report information If can be generated and used for subsequent processing. Therefore, the activation timing of the response-prioritized control unit 30 and the reliability of the processing content in the response-prioritized control unit 30 can be further improved as compared with the second embodiment in which the prompt report information If is used as it is.

According to the embodiment of the externality recognition device described above, with the configuration of the first embodiment, it is possible to obtain an effect that the safety, the convenience, and the comfort of the vehicle can be enhanced by preferentially referring to the detection result by the position detection means with a small delay amount in the function with high urgency and referring to the integration result in the control processing with priority on accuracy.

With the configuration of the second embodiment, in addition to the effect of the first embodiment, the statistical information of the prompt report information If is obtained, the prompt report information If is referred to if it is determined that the reliability is sufficiently high, and the information is switched to the integrated information Ii if it is determined that the reliability is not sufficient. Accordingly, an effect similar to that of the first embodiment can be obtained in a normal state in which the reliability of the prompt report information If can be sufficiently obtained, and an effect in which an adverse effect caused by referring to the prompt report information If in the first embodiment can be avoided can be obtained.

With the configuration of the third embodiment, in addition to the effect of the second embodiment, it is possible to perform a correction processing of bringing the prompt report information If closer to the more reliable integrated information Ii, and an effect of improving the reliability of the prompt report information If can be obtained.

Note that the present invention is not limited to the above-described embodiments, and includes various modifications. For example, the above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

In addition, a part or all of the above-described configurations, functions, processors, processing means, and the like may be realized by hardware, for example, by designing with an integrated circuit. In addition, each of the above-described configurations, functions, and the like may be realized by software by a processor interpreting and executing a program for realizing each function. Information such as a program, a table, a file, and the like for realizing each function can be stored in a storage device such as a memory, a hard disk, and a solid state drive (SSD), or a recording medium such as an II card, an SD card, a DVD, and the like.

In addition, the control lines and the information lines indicate those necessary for the description, and do not necessarily indicate all the control lines and the information lines on the product. In practice, it may be considered that almost all the configurations are connected to each other.

REFERENCE SIGNS LIST 100 vehicle
10, 10A, 10B externality recognition device
A, B, C externality sensor
1, 1A sensor fusion processing unit
11 time synchronization processing unit
12 integration processing unit
13 intra-sensor-type time synchronization unit
14 intra-sensor-type integration processing unit
15 inter-sensor-type time synchronization unit
16 inter-sensor-type integration processing unit
2, 2A, 2B controller
3 distribution information generation unit
31 angular region classification unit
32 distance region classification unit
33 statistical information calculation unit
33a E [R$_1$] calculation unit
33b E [R$_2$] calculation unit
33c E [R$_1$$^2$] calculation unit
33d E [R$_1$·R$_2$] calculation unit
33e E [θ$_1$] calculation unit
33f E [θ$_2$] calculation unit
33g E [θ$_1$$^2$] calculation unit
33h E [θ$_1$·θ$_2$] calculation unit
4 detection information selection unit
5 prompt report information correction unit
20 accuracy-prioritized control unit
30 response-prioritized control unit
40 control target

The invention claimed is:

1. A vehicle control system comprising:
a first type sensor;
a second type sensor; and
a processor, coupled to the first type sensor and the second type sensor, configured to:
   detect a target around a vehicle using the first type sensor and the second type sensor;
   obtain, from the first type sensor, first detection information associated with the target;
   obtain, from the second type sensor, second detection information associated with the target at a same time point as obtaining the first detection information, the second type sensor having a longer delay time to output the second detection information relative to a time for the first type sensor to output the first detection information;
generate, before or after processing outputs from the first type sensor and the second type sensor to obtain the first detection information and the second detection information at the same time point, prompt report information based on at least one of the first detection information or the second detection information;
generate integrated information based on an integration between the first detection information and the second detection information;
generate an instruction based on at least one of the prompt report information or the integrated information; and
control the vehicle subsequent to an execution of the instruction.

2. The vehicle control system according to claim 1, comprising:
a plurality of first type sensors including the first type sensor; and
a plurality of the second type sensors including the second type sensor, wherein the processor is configured to:
   integrate a plurality of pieces of the first detection information output from the plurality of first type sensors;
   integrate a plurality of pieces of the second detection information output from the plurality of second type sensors; and
   integrate the integrated plurality of pieces of the first detection information and the integrated plurality of pieces of the second detection information.

3. The vehicle control system according to claim 2, wherein to generate the prompt report information or the integrated information, the processor is configured to:
generate the prompt report information based on at least one of the integrated plurality of pieces of the first detection information or the integrated plurality of pieces of the second detection information; and
generate the integrated information by integrating the integrated plurality of pieces of the first detection information and the integrated plurality of pieces of the second detection information.

4. The vehicle control system according to claim 1, wherein the processor is configured to:
generate post-synchronization information according to a resample of the first detection information or the second detection information to have a same sampling time as the integrated information;
generate distribution information between the integrated information and the post-synchronization information;
obtain a correlation between the integrated information and the post-synchronization information based on the distribution information;
generate the instruction based on the prompt report information when the correlation is at or above a threshold; and
generate the instruction based on the integrated information when the correlation is below the threshold.

5. The vehicle control system according to claim 4, wherein the processor is configured to:
obtain a regression line between the integrated information and the post-synchronization information;

generate corrected prompt report information from a correction to the prompt report information based on a characteristic of the regression line; and generate the instruction based on at least one of the corrected prompt report information or the integrated information.

6. The vehicle control system according to claim 1, wherein to generate the instruction, the processor is configured to:

generate a stop instruction based on the integrated information.

7. The vehicle control system according to claim 1, wherein:

the first type sensor is a millimeter wave radar, and the second type sensor is an in-vehicle camera.

8. The vehicle control system according to claim 1, wherein the processor is configured to:

execute first control processing based on the prompt report information; and execute second control processing different from the first control processing based on the integrated information.

9. A method comprising:

detecting, by a processor coupled to a first type sensor and a second type sensor, a target around a vehicle using the first type sensor and the second type sensor;

obtaining, by the processor from the first type sensor, first detection information associated with the target;

obtaining, by the processor from the second type sensor, second detection information associated with the target at a same time point as obtaining the first detection information, the second type sensor having a longer delay time to output the second detection information relative to a time for the first type sensor to output the first detection information, generating, by the processor before or after processing outputs from the first type sensor and the second type sensor to obtain the first detection information and the second detection information at the same time point, prompt report information based on at least one of the first detection information or the second detection information;

generating, by the processor, integrated information based on an integration between the first detection information and the second detection information;

generating, by the processor, an instruction based on at least one of the prompt report information or the integrated information; and controlling, by the processor, the vehicle subsequent to an execution of the instruction.

* * * * *